(12) United States Patent
Homner

(10) Patent No.: US 7,762,738 B2
(45) Date of Patent: Jul. 27, 2010

(54) ARRANGEMENT FOR FIXING COMPONENTS DETACHABLY TO A CEILING OR WALL

(75) Inventor: Bernhard Homner, Stammheim (DE)

(73) Assignee: S-Fasteners GmbH, Magstadt (DE)

( * ) Notice: Subject to any disclaimer, the term of this patent is extended or adjusted under 35 U.S.C. 154(b) by 476 days.

(21) Appl. No.: 11/682,099

(22) Filed: Mar. 5, 2007

(65) Prior Publication Data
US 2008/0273922 A1    Nov. 6, 2008

(30) Foreign Application Priority Data
Mar. 13, 2006  (DE) .................. 20 2006 004 081 U

(51) Int. Cl.
*F16B 21/09*  (2006.01)
*E05C 19/00*  (2006.01)
(52) U.S. Cl. .................... 403/315; 403/316; 403/318; 403/319; 292/302
(58) Field of Classification Search ......... 403/315–319, 403/321, 322.1, 323–328, 360, DIG. 4, 109.1, 403/109.2, 108, 377, 379.2, 359.4, 359.5, 403/204, 294; 411/352, 356, 522, 523; 24/573.09, 24/578.13, 297, 453, 458; 292/302, 304, 292/310, 341.15
See application file for complete search history.

(56) References Cited

U.S. PATENT DOCUMENTS

| | | |
|---|---|---|
| 309,181 A | 12/1884 | Woodrich |
| 1,093,637 A | 4/1914 | Lint |
| 3,266,831 A | 8/1966 | Banse |
| 3,571,977 A | 3/1971 | Abeel |
| 5,217,339 A | 6/1993 | O'Connor |
| 5,426,905 A | 6/1995 | Rollhauser |
| 5,529,369 A | 6/1996 | Welborn |
| 5,655,801 A | 8/1997 | Casey |
| 5,782,511 A | 7/1998 | Schwarz |

(Continued)

FOREIGN PATENT DOCUMENTS

DE       1860948 U       10/1962

(Continued)

OTHER PUBLICATIONS

U.S. Appl. No. 11/950,643, Homner.
U.S. Appl. No. 11/950,630, Homner.

*Primary Examiner*—Victor MacArthur
(74) *Attorney, Agent, or Firm*—Woodling, Krost and Rust

(57) ABSTRACT

The component (X) is connected to a seat housing (1) and the retaining bolt with the ceiling (or wall) Y. The seat housing (1) has an opening for receiving a plug-in element (4). A part of the retaining bolt with a recess projects into the seat housing. A connecting element is provided in the plug-in element (4) (or in the seat housing), which, when the plug-in element is inserted into the seat housing, engages the recess of the retaining bolt. In the inserted state, the plug-in element (4) is held in position in the seat housing (1) by a detachable lock-in connection. When the lock-in connection is released, an opening spring pushes the plug-in element into the open position. An insert arrangement which encircles the retaining bolt (and if required, a vibration-damping ring) is provided for fixing the retaining bolt in the ceiling.

17 Claims, 8 Drawing Sheets

U.S. PATENT DOCUMENTS

| | | |
|---|---|---|
| 6,149,210 A | 11/2000 | Hunt |
| 6,409,446 B1 | 6/2002 | Schwarz |
| 6,442,806 B1 | 9/2002 | Wesson |
| 6,443,679 B1 | 9/2002 | Schwarz |
| 6,497,436 B1 | 12/2002 | Deblock |
| 6,679,530 B2 | 1/2004 | Krynski |
| 6,736,438 B1 | 5/2004 | Wieclawski |
| 6,837,661 B2 | 1/2005 | Schwarz et al. |
| 6,866,227 B2 | 3/2005 | Pratt |
| 7,107,697 B2 | 9/2006 | Schwarz et al. |
| 7,179,039 B2 | 2/2007 | Schwarz et al |
| 2004/0115030 A1 | 6/2004 | Schwarz |
| 2004/0240933 A1 | 12/2004 | Schwarz et al. |
| 2007/0147975 A1 | 6/2007 | Homner |
| 2007/0158955 A1 | 7/2007 | Homner |

FOREIGN PATENT DOCUMENTS

| | | |
|---|---|---|
| DE | 3145155 A1 | 11/1981 |
| DE | 8710288 U1 | 10/1987 |
| DE | 3623311 A1 | 1/1988 |
| DE | 3922025 C1 | 9/1990 |
| DE | 4239908 C1 | 3/1994 |
| DE | 19707634 A1 | 10/1997 |
| DE | 29808914 U1 | 9/1998 |
| DE | 29914145 U1 | 12/2000 |
| DE | 10040410 A1 | 1/2001 |
| DE | 19943083 A1 | 12/2001 |
| DE | 20218302 U1 | 3/2003 |
| DE | 10355780 A1 | 6/2005 |
| DE | 102004011183 A1 | 9/2005 |
| DE | 102006008655 A1 | 9/2006 |
| DE | 202006019165.8 | 8/2007 |
| DE | 202007000112.6 | 8/2007 |
| EP | 0189569 B1 | 2/1989 |
| EP | 0784141 A1 | 7/1997 |
| EP | 06026133 | 3/2007 |
| EP | 07004742 | 5/2007 |
| EP | 07024364 | 6/2008 |
| EP | 07024365 | 6/2008 |
| GB | 1268022 | 3/1972 |
| GB | 1506902 | 4/1978 |
| GB | 2050487 A | 1/1981 |
| GB | 2219342 A | 12/1989 |
| JP | 2000310210 A | 7/2000 |
| WO | 80/00162 A1 | 2/1980 |

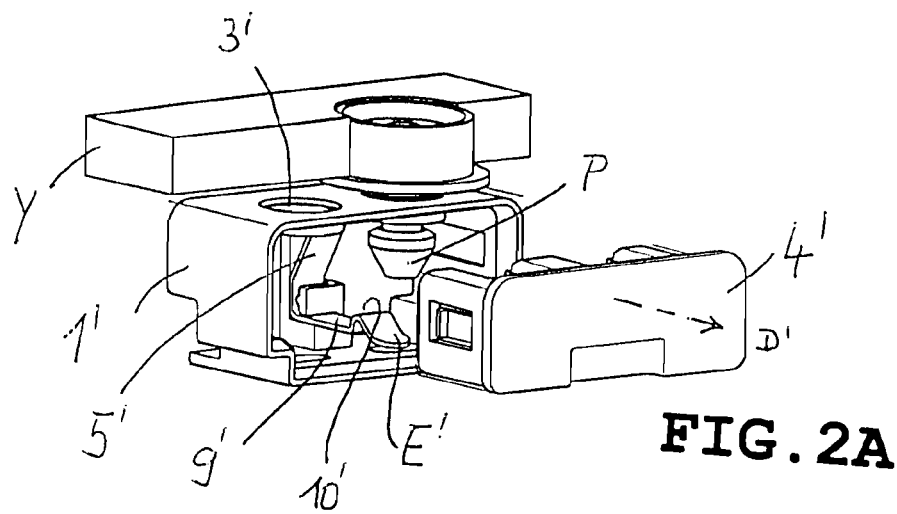
FIG. 2A
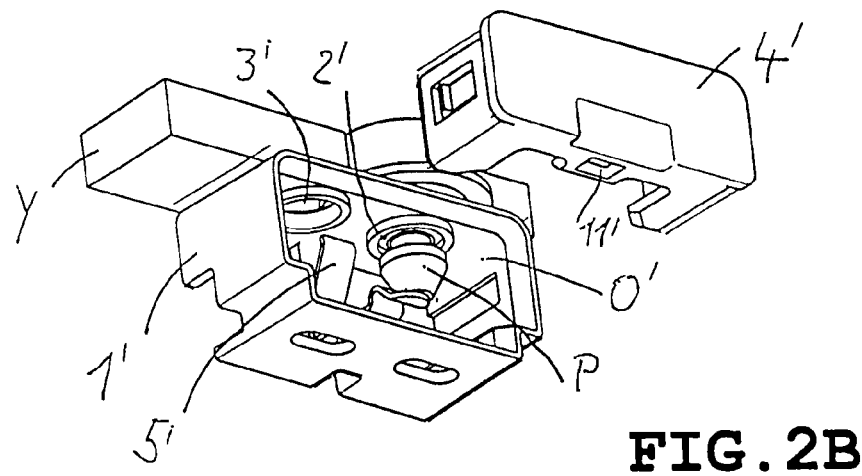
FIG. 2B
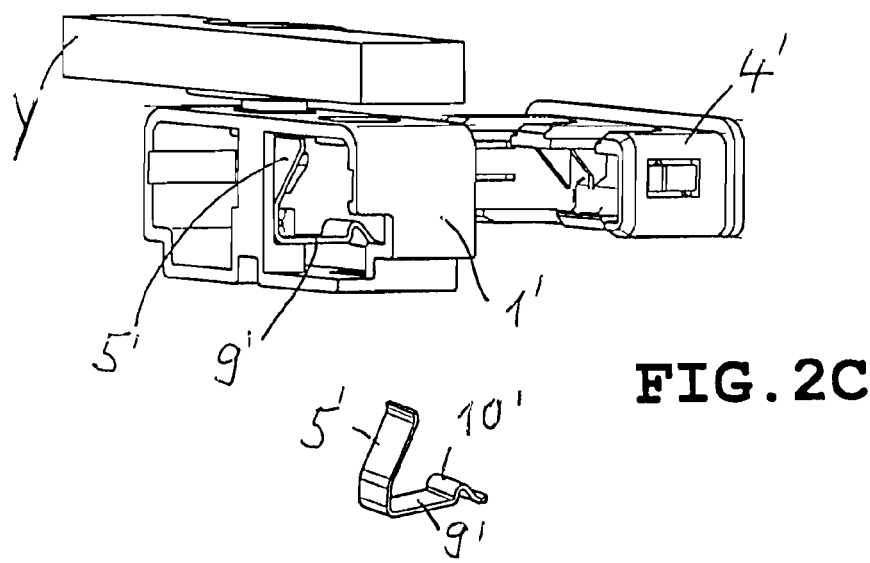
FIG. 2C
FIG. 2D

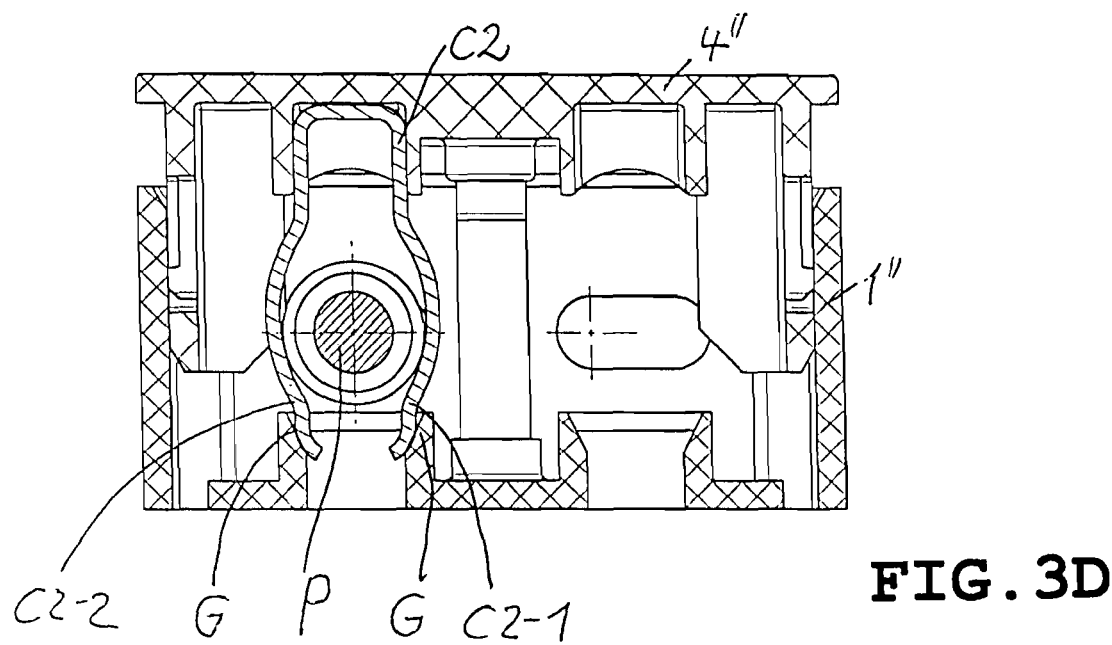
FIG. 3D
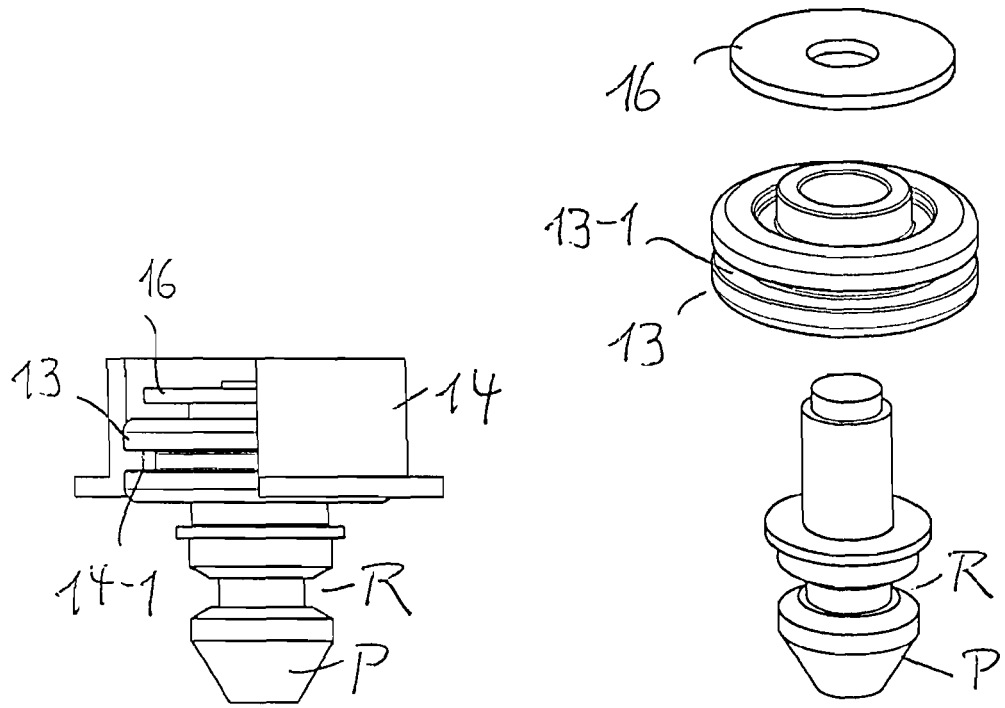
FIG. 4
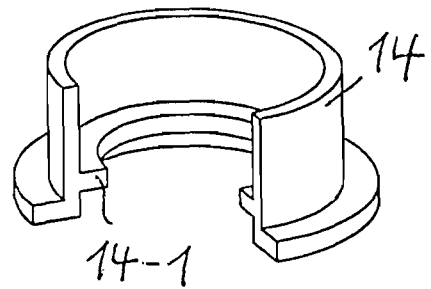

ARRANGEMENT FOR FIXING COMPONENTS DETACHABLY TO A CEILING OR WALL

Field of the Invention

This application claims priority to German patent application DE 20 2006 004 081.1 filed Mar. 13, 2006.

The invention concerns an arrangement for fixing components detachably to a ceiling or wall, preferably a fixing arrangement for attaching ceiling and wall panelling, especially in aircraft.

The purpose of the invention is to provide a new type of fixing arrangement which is safe and easy to handle, cheap and simple to manufacture and which may be light in weight and low in volume.

This purpose of the invention is resolved by the features detailed in the characterising section of the claims 1, 17, 18 and 20. Advantageous developments of the invention are detailed in the sub-claims. Practical examples of the invention are shown in the drawings and are described in more detail below.

BRIEF DESCRIPTION OF THE DRAWINGS

FIG. 2A is an isometric drawing of a second variation of the fixing arrangement according to invention with a plug-in element and a seat housing shown separately.

FIG. 2B is an isometric drawing of the arrangement according to FIG. 2A viewed from the front and diagonally from below into the seat housing.

FIG. 2C is an isometric drawing of the arrangement according to FIG. 2A and FIG. 2B viewed diagonally from behind into the seat housing and the plug-in element.

FIG. 2D is an isometric single-part drawing of the two-sided leaf spring according to the arrangement in FIG. 2A and FIG. 2B.

FIG. 3D is a section drawing of the plug-in element according to FIG. 3C partially inserted into the seat housing according to FIG. 3A, showing the U-shaped retaining spring as a connecting element to the retaining bolt.

FIG. 4 is an isometric part sectional drawing of a retaining-bolt insert arrangement with vibration-damping ring for attachment to an opening in the ceiling.

DESCRIPTION OF THE INVENTION

FIG. 1 shows an isometric drawing of a first variation of the fixing arrangement according to invention for fixing a component (X) detachably to a ceiling (Y), consisting of a seat housing 1 and a plug-in element 4, where the plug-in element 4 is inserted fully into the seat housing 1.

A retaining bolt P is attached in the ceiling (Y) projecting outwards from the ceiling (for more details of this, see FIG. 1D and FIG. 4) and has a recess R for hooking a connecting element C1 (see FIG. 1C) into position. Part of the retaining bolt P with the recess R projects through an opening 2 (FIG. 1D) into the seat housing 1.

When the plug-in element 4 is pushed into the seat housing 1, the edges 6-1 and 6-2 of the open slit 6 of the connecting element C1 of the plug-in element 4 (see FIG. 1C) hook into the concentric ring-groove-shaped recess R of the retaining bolt P. In this way the ceiling Y is connected with the component X via the retaining bolt P and the seat housing/plug-in element arrangement. The recess R may also be formed by lateral grooves positioned opposite one another in the retaining bolt.

Figure 1A:
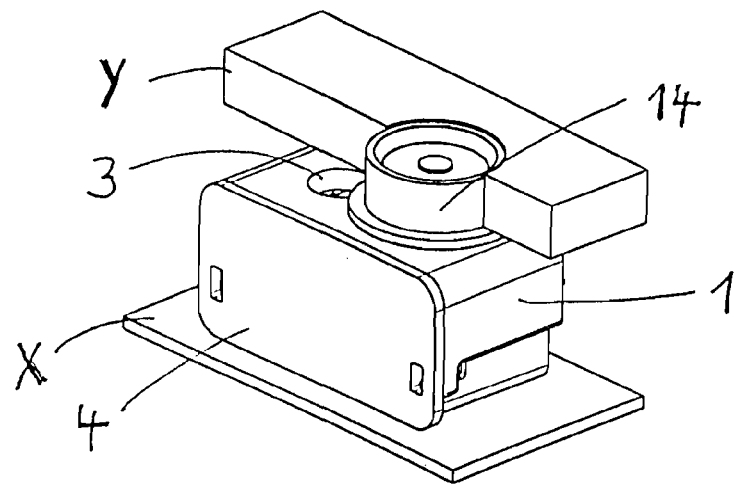
FIG. 1A is an isometric drawing of a first variation of the fixing arrangement according to the invention comprising a seat housing and a plug-in element, where the plug-in element is inserted fully into the seat housing.
Figure 1B:
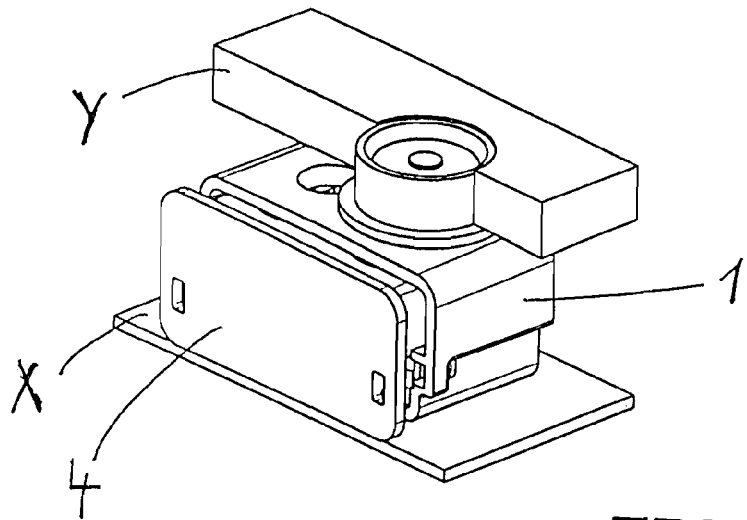
FIG. 1B is an isometric drawing of the arrangement according to FIG. 1A, where the plug-in element is inserted only partly into the seat housing.
Figure 1C:
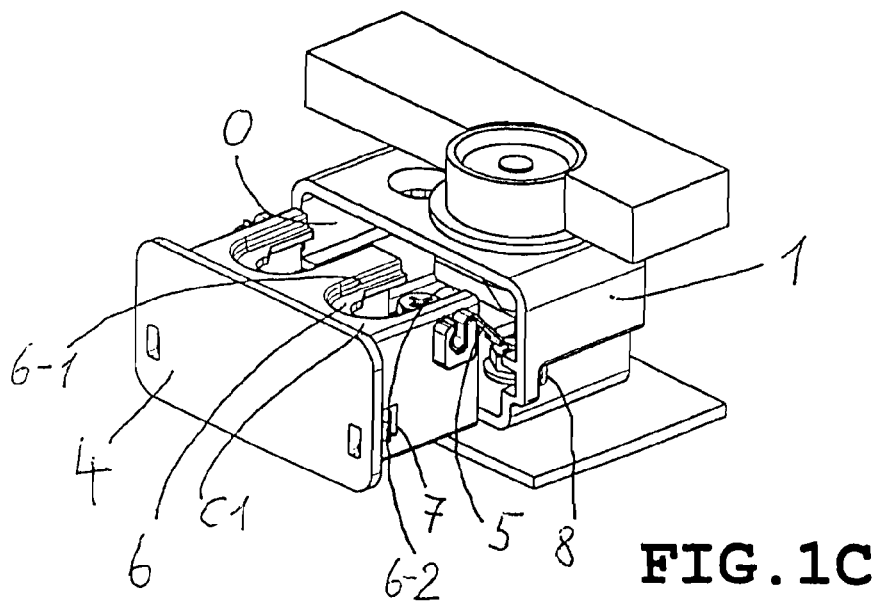
FIG. 1C is an isometric drawing of the arrangement according to FIG. 1A or FIG. 1B, where the plug-in element and the seat housing are shown separately.
Figure 1D:
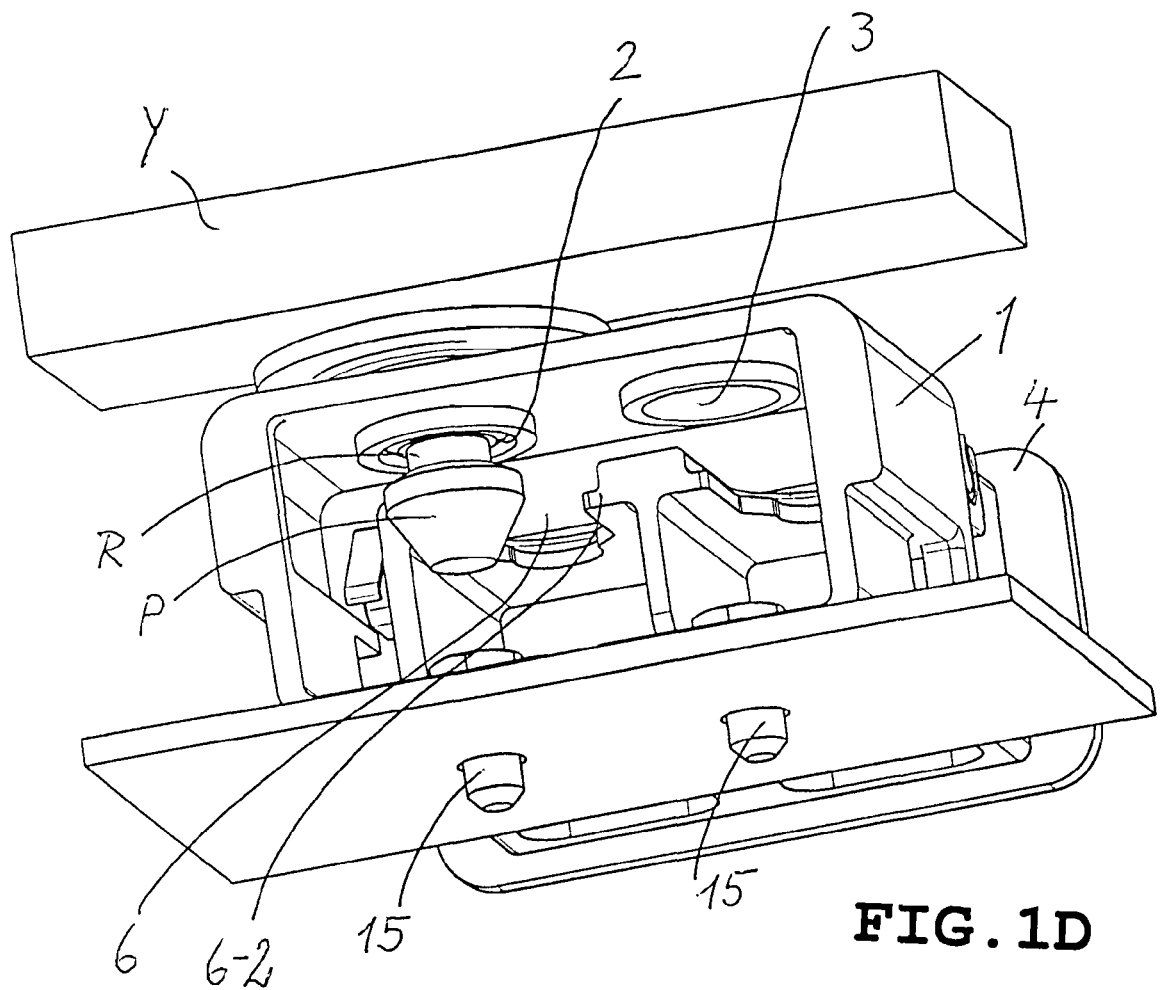
FIG. 1D is an isometric drawing according to FIG. 1C showing a rear view of the seat housing with the retaining bolts.

The component X, preferably a wall or ceiling paneling element, may be joined in any way to the seat housing 1, e.g. by a screw 15 (FIG. 1D).

FIG. 1D shows an isometric drawing according to FIG. 1C with a rear view of the seat housing 1. The retaining bolt P fixed in the ceiling, projects into the seat housing where its concentric retaining groove R is connected with the connecting element C1, i.e. with the edges 6-2 and 6-1 (not visible in FIG. 1D) of the slit 6 of the plug-in element 4.

FIG. 4 shows an isometric part sectional drawing of an arrangement for fixing the retaining bolt P in the ceiling as well as the individual parts of this arrangement. The shaft of the retaining bolt P is inserted into a vibration-damping ring 13 with an outer ring-shaped recess 13-1 into which the ring-shaped interior projection 14-1 of the hollow-cylinder-shaped insert element 14 projects. At its top end the retaining bolt P is permanently connected to a retaining disk 16. The insert element 14 is connected permanently with the ceiling by adhesive bonding in a suitable hole in the ceiling. It should be noted that any other method of attaching the retaining bolt P to the ceiling (with or without vibration-damping ring) may be used.

Figure 5:
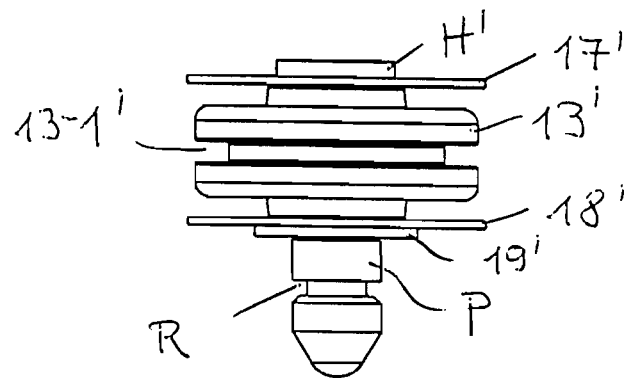
FIG. 5 is an isometric drawing of a retaining-bolt assembly with vibration-damping ring for attachment to an opening in the ceiling with a ring-shaped interior projection.
Figure 5:
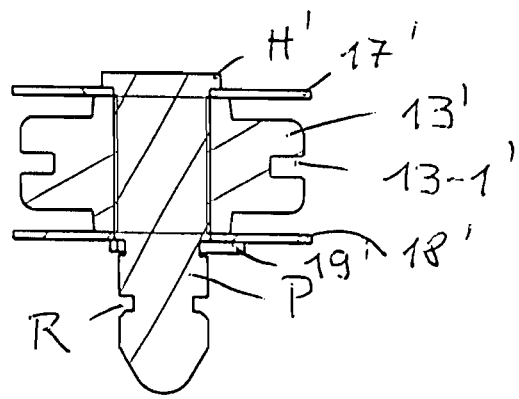
Figure 5:
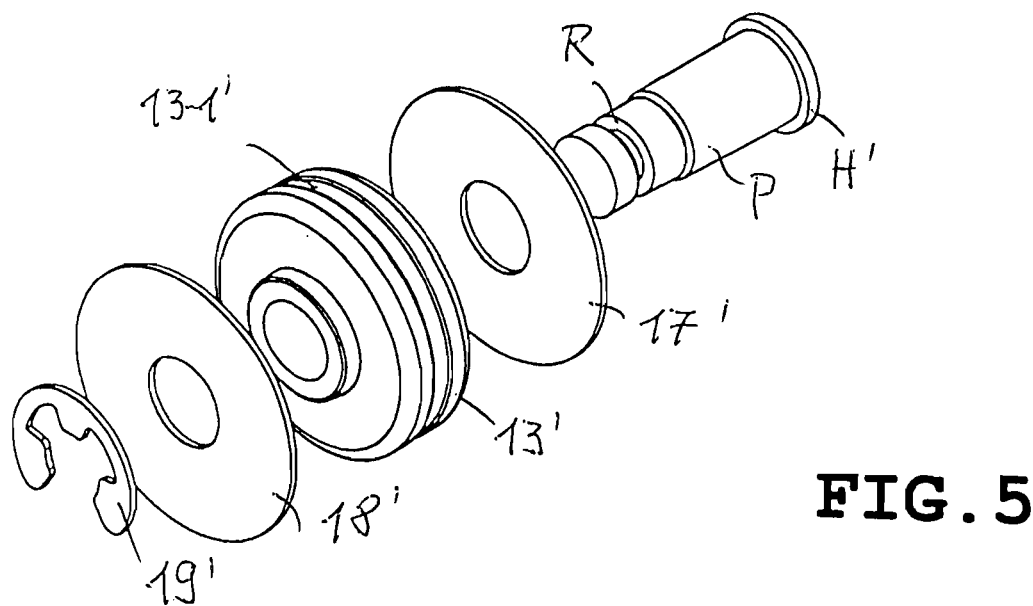

FIG. 5 shows an isometric drawing of a retaining-bolt assembly with vibration-damping ring for attachment to a hole in the ceiling with a ring-shaped interior projection. On the retaining bolt P with bolt head H' a vibration-damping ring 13' with an upper retaining disk 17' and a lower retaining disk 18' is located on the upper area of the shaft between the bolt head H' and a securing element 19', preferably a securing disk, located on the retaining bolt P.

The vibration-damping ring 13' has an outer concentric ring groove 13-1' in which an imaginary ring-shaped interior projection of a hole in a ceiling or wall for receiving the vibration-damping ring may be located. The end of the retaining bolt P projecting from the vibration-damping ring 13' has a recess R for locking an imaginary connecting element into position.

During insertion into the seat housing 1, the plug-in element 4 is guided in order to ensure that the retaining bolt P is locked at the point of its recess R. As soon as the plug-in element 4 has been pushed fully into the seat housing 1, it is locked automatically into position. A releasable lock-in connection is provided for this purpose between the seat housing 1 and the plug-in element 4. The lock-in connection consists of spring-loaded tappets on either side of the plug-in element 4 which lock into through holes 8 of the walls of the seat housing (1).

In order to release this lock-in connection, a tool must be used to press the locking tappets 7 in the opening 8 inwards. Opening springs 5 are located on either side of the plug-in element 4 to ensure that the plug-in element 4 is pushed out of the seat housing 1 automatically when the lock-in connection is released.

The locking tappets can also be located on the seat housing in order to engage suitable recesses in the plug-in element.

Figure 1E:
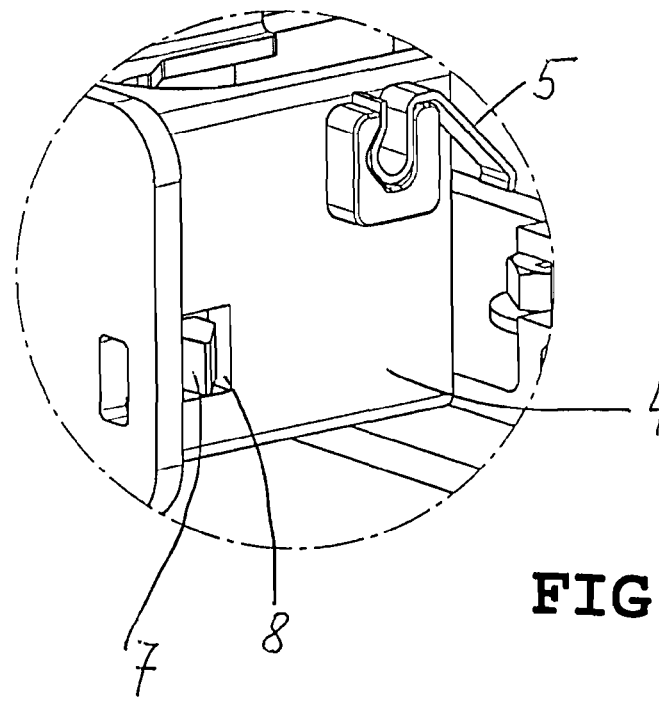
FIG. 1E is an isometric detail drawing of the arrangement according to FIG. 1C with a view of the lock-in connection between the plug-in element and the seat housing and of the opening spring.

FIG. 1E shows an isometric detail drawing of the arrangement according to FIG. 1C with a view of the lock-in connection of the plug-in element 4 with the seat housing 1, and of the opening spring 5. This is a leaf spring whose spring arm, in the inserted state, exerts pressure on an abutment located in the seat housing 1 in such a way that, when the lock-in connection is released, the plug-in element 4 is pushed out of the seat housing 1. The ejection movement is (as explained below) limited in order to prevent the plug-in element 4 from separating completely from the seat housing 1.

FIG. 2A shows an isometric drawing of a second variation of the fixing arrangement according to invention with a plug-in element 4' and a seat housing 1' shown separately. This second variation differs from the first according to FIG. 1A to FIG. 1D with respect to the lock-in connection between the seat housing 1', the plug-in element 4' and the opening spring.

For the lock-in connection between the seat housing 1' and the plug-in element 4', a spring tongue 9' of spring steel with a locking tappet 10' is provided in the seat housing 1' which, in the inserted position, locks into the recess 11' of the plug-in element 4' (see FIGS. 2A and 2B).

Figure 2F:
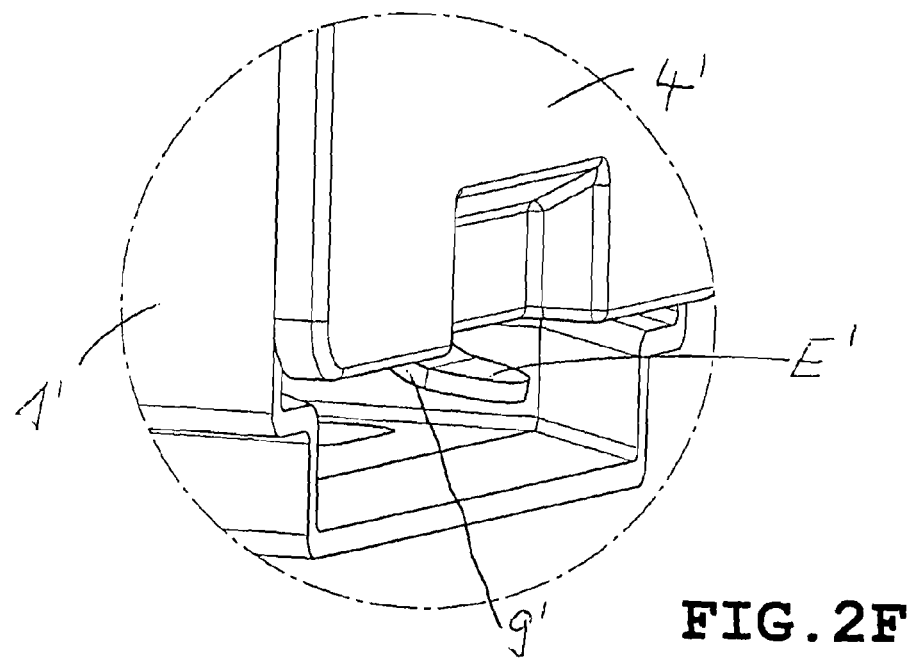
FIG. 2F is an isometric partial drawing of the arrangement according to FIG. 2E with view onto the manually operated end of the spring tongue for releasing the lock-in connection.

FIG. 2B shows an isometric drawing of the arrangement according to FIG. 2A viewed from the front and diagonally from below into the seat housing. In the inserted state, the free end E' of the spring tongue 9' is accessible for manual operation in order to release the lock connection (see also FIG. 2F).

Figure 2E:
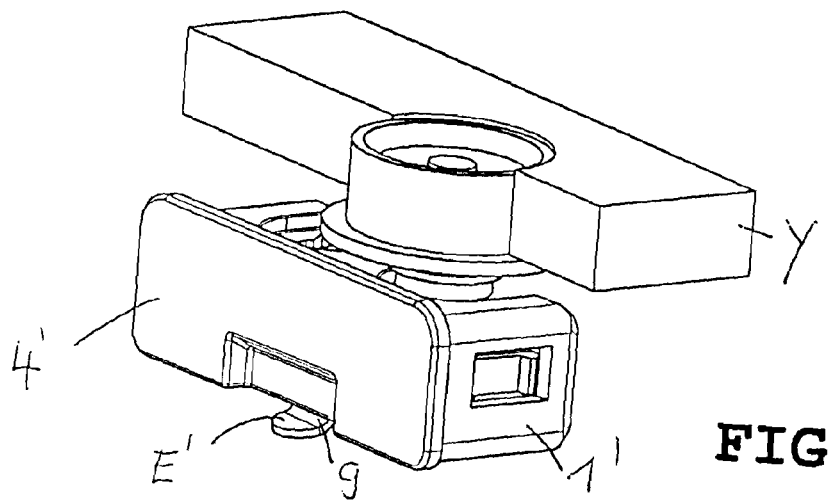
FIG. 2E is an isometric drawing of the arrangement according to FIG. 2A where the plug-in element is pushed fully into the seat housing and represents the second variation of the fixing arrangement according to invention, where the plug-in element is inserted completely into the seat housing.

FIG. 2F shows an isometric partial drawing of the arrangement according to FIG. 2E with view onto the manually operated end of the spring tongue E' for releasing the lock-in connection. When the end E' of the spring tongue 9' is pressed down, the lock-in connection is released by moving the locking tappet 10' (FIG. 2A) out of the recess 11' (FIG. 2B).

When the lock-in connection is released, the plug-in element 4' is pushed out of the seat housing 1' by the opening spring 5'.

The spring tongue 9' and the opening spring 5' are parts of a common two-sided leaf spring (5'/9'), one of whose sides (9') is the spring tongue and the other side (5') the opening spring (see also FIG. 2C and FIG. 2D).

FIG. 2C shows an isometric drawing of the arrangement according to FIG. 2A and

FIG. 2B viewed diagonally from beneath into the seat housing 1'.

FIG. 2D shows an isometric single-part drawing of the two-sided leaf spring (5'/9'). The crown of the leaf spring (5'/9') is fitted positively into the seat housing 1'. The double-sided leaf spring (5'/9') may be replaced by two single leaf springs.

Figure 2G:
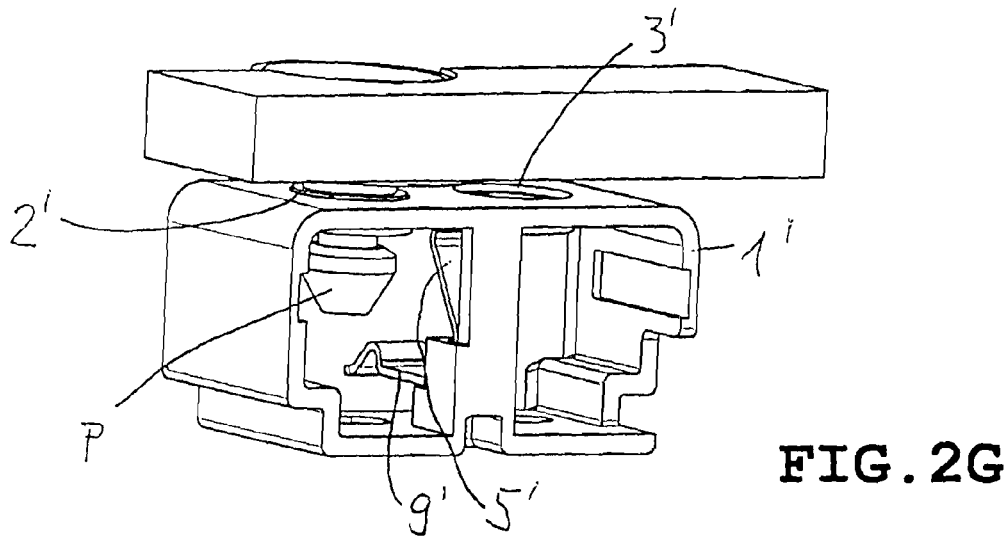
FIG. 2G is an isometric drawing of the seat housing according to FIG. 2A with view of the rear side.

FIG. 2G shows an isometric drawing of the seat housing 1' according to FIG. 2A with view of the rear side.

FIG. 2E shows an isometric drawing of the second variation of the fixing arrangement according to invention, where the plug-in element 4' is inserted completely into the seat housing 1'.

Figure 3A:
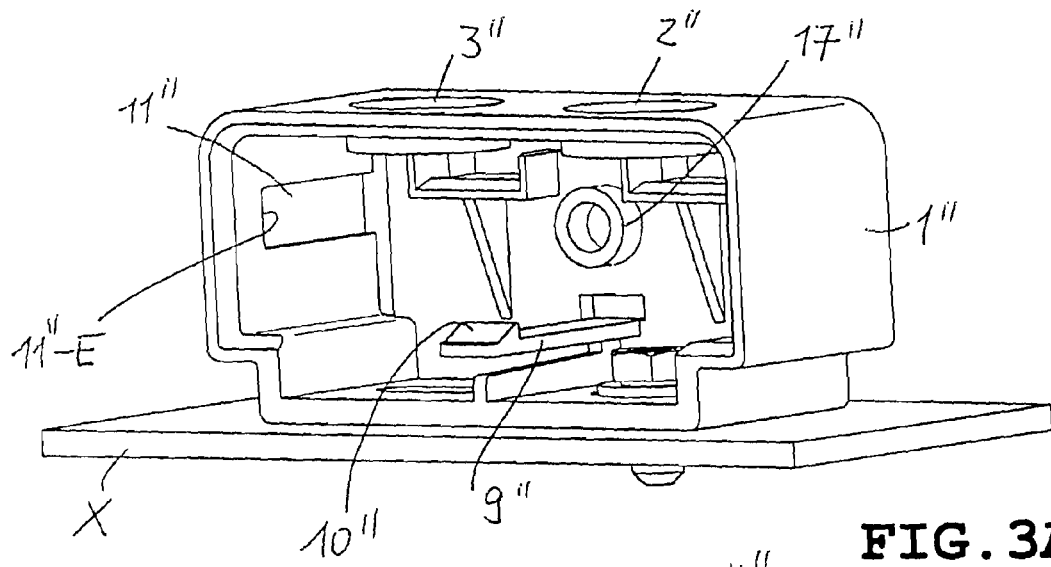
FIG. 3A is an isometric drawing of the seat housing (with view of the front) for a third variation of the fixing arrangement according to invention.

FIG. 3A shows an isometric drawing of the seat housing 1" (for plug-in element 4") for a third variation of the fixing arrangement according to invention (with view of the front of the seat housing).

Figure 3B:
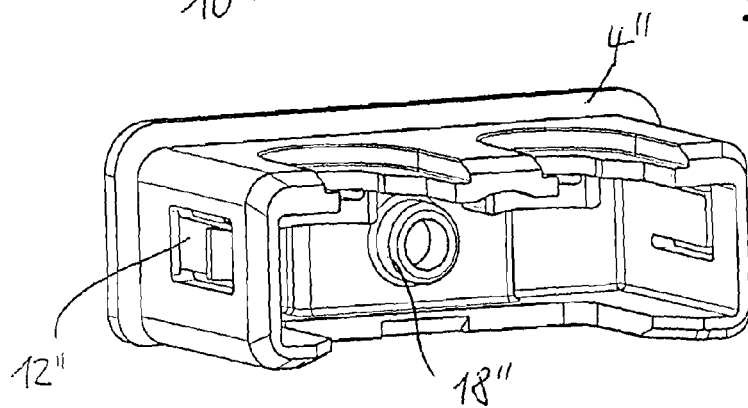
FIG. 3B is an isometric drawing of the plug-in element (view of rear side) for the seat housing according to FIG. 3A.

FIG. 3B shows an isometric drawing of the plug-in element 4" (view of rear side) for the third variation of the fixing arrangement according to invention.

Figure 3C:
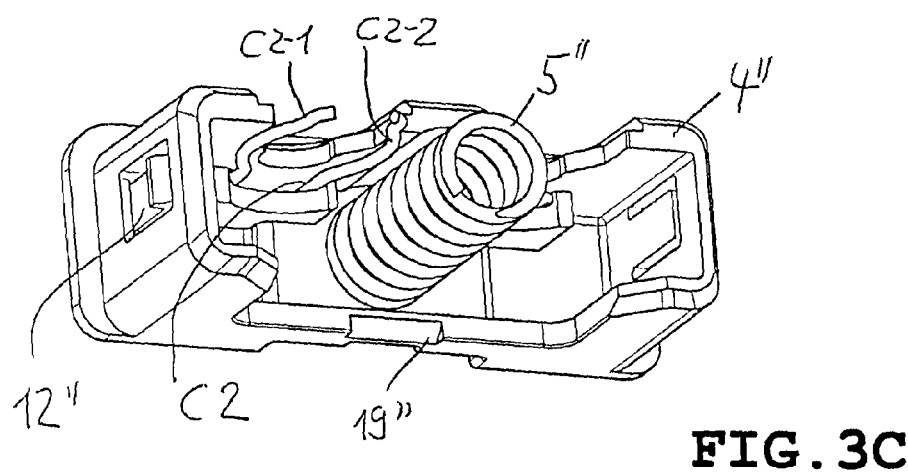
FIG. 3C is an isometric drawing of the plug-in element (view of rear side according to FIG. 3B showing a U-shaped retaining spring and a spiral pressure spring as opening spring.

FIG. 3C shows an isometric drawing of the plug-in element 4" (view of rear side) according to FIG. 3B showing a U-shaped retaining spring C2 and a spiral pressure spring 5" as opening spring.

FIG. 3D shows a section drawing of the plug-in element 1" according to FIG. 3C partially inserted into the seat housing 1" according to FIG. 3A, showing the U-shaped retaining spring C2 as a connecting element to the retaining bolt P.

This third variation of the fixing arrangement according to invention differs from the first and second forms with reference to the lock-in connection between the plug-in element 4" and the seat housing 1" and the opening spring 5".

According to FIG. 3A, the lock-in connection between the seat housing 1" and the plug-in element 1" is formed by a plastic spring tongue 9" with lock-in tappet 10" located in the seat housing 1", which locks into a corresponding recess 19" of the plug-in element 4".

The free end of this spring tongue 9" can be operated manually to release the lock-in connection in the same way as the spring tongue 9' in the second variation (see FIG. 2F).

Between the supports 17" (FIG. 3A) in the seat housing 1" and 18" (FIG. 3B) in the plug-in element 1", a spiral pressure spring 5" is located to function as an opening spring. When the lock-in connection is released, the plug-in element 4" is pressed out of the seat housing 1" by the force of this spring.

A U-shaped wire spring C2 is provided as a connecting element between the plug-in element 4"/housing 1" and the retaining bolt P, which is arranged in the plug-in element 4" in such a way that its sides C2-1, C2-2 are guided past both sides of the retaining bolt P when the plug-in element 4" is pushed into the seat housing 1". In doing so, the sides are forced to approach one another by a narrowing guide G (FIG. 3D) located in the receiving shaft 1" until the parts of the sides C2-1, C2-2 on either side of the retaining bolt P engage the recess R of the retaining bolt P.

Figure 6:
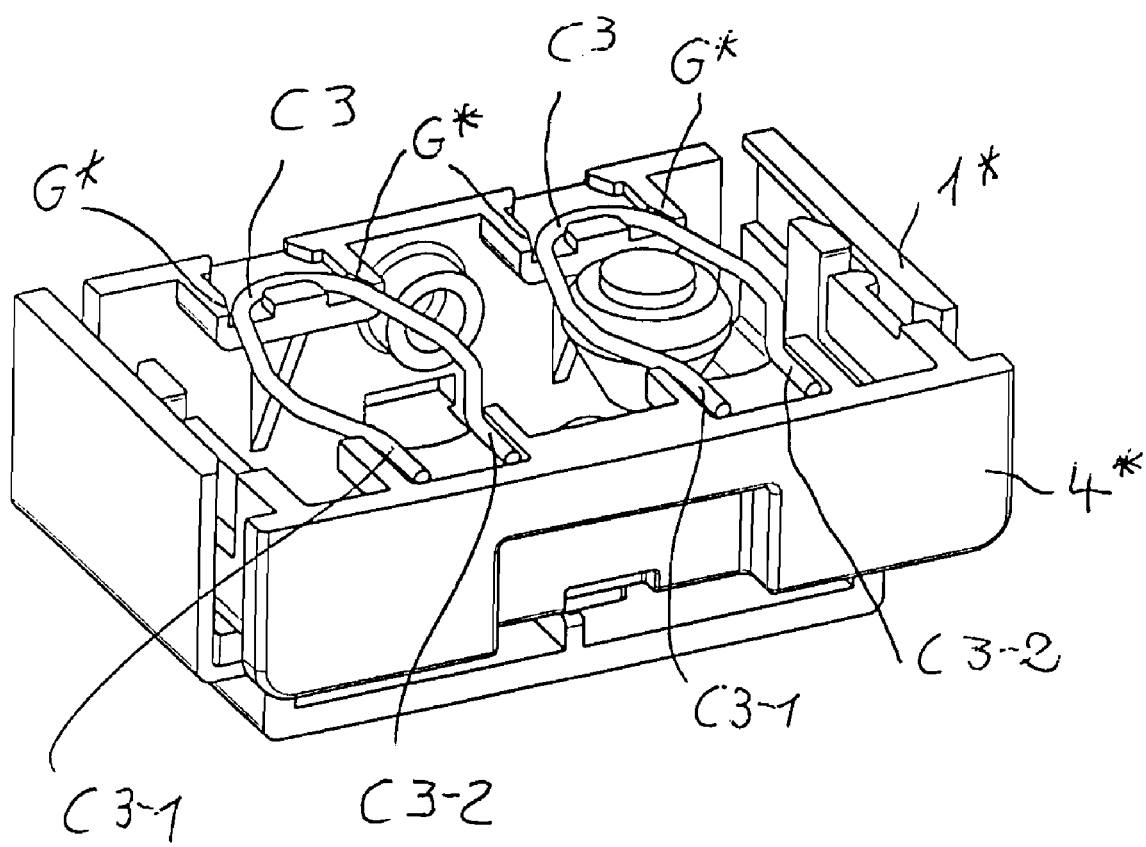
FIG. 6 is a section drawing of the plug-in element similar to FIG. 3D partially inserted into the seat housing showing a U-shaped retaining spring, arranged differently than in FIG. 3D, as a connecting element to the retaining bolt.

FIG. 6 shows a section drawing of the plug-in element similar to FIG. 3D partially inserted into the seat housing showing a U-shaped wire spring C3, arranged and shaped differently than in FIG. 3D, as a connecting element to the retaining bolt. This wire spring is arranged in the seat housing 1* in such a way that its sides C3-1, C3-2 are located on either side of retaining bolt P at a distance therefrom.

When the plug-in element 4* is pushed into the seat housing 1*, these sides C3-1, C3-2 approach one another through a narrowing guide G* located in the seat housing 1*, until the parts of the sides C3-1, C3-2 on either side of the retaining bolt P engage the recess R of the retaining bolt P.

The guide G (FIG. 3D) and guide G* (FIG. 6) in the seat housing may be supplemented by an additional guide in plug-in element 4".

In addition to its connecting function with the retaining bolt, the U-shaped wire spring C2 (FIG. 3D) or C3 (FIG. 6) may also act as an opening spring to push the plug-in element out of the seat housing when the lock-in connection of the plug-in element with the seat housing is released.

This possibility is provided by a forcing component acting in opening direction on the diagonally located guide.

For reasons of simplicity, a second U-shaped wire spring is not shown in the right-hand half of the plug-in element 4" and seat housing 1* in FIG. 3C and FIG. 3D.

In all variations of the fixing arrangement according to invention, the outward movement of the plug-in element 4" from the seat housing 1" is limited by a stop device. For this purpose, a guide groove 11" for a spring tappet 12" located in the plug-in element 4" is provided in the wall of the seat housing 1" (FIG. 3A, 3B) for which the end of the groove 11"-E forms a stop.

The seat housing may have one opening only for inserting the part of the retaining bolt P with the recess R into the housing, or several openings (2, 2', 2", 3, 3', 3") into which the bolt may be inserted as required.

In this way it is possible to take account of differing edge distances which may be required in the components (i.e. the distance from the edge of the component at which the seat housings are to be attached).

The fixing arrangement according to invention is used preferably for installing wall and ceiling paneling in aircraft. For the installation of panels, several fixing arrangements are necessary which should be installed towards the edges.

To save weight, the seat housing and the plug-in element may be manufactured of plastic, preferably polyetherimide.

The invention claimed is:

1. An arrangement in combination with a first wall or panel (X) and a ceiling or second wall (Y), comprising:
    a retaining bolt (P), said retaining bolt (P) includes a recess (R), said retaining bolt (P) extending from and projecting out of said ceiling (Y), and, said retaining bolt attached to said ceiling (Y);
    a seat housing, said seat housing includes at least one opening, said first wall (X) affixed to said seat housing;
    said retaining bolt (P) extending through said at least one opening, said recess (R) of said retaining bolt (P) residing within said seat housing;
    a plug-in element, said plug-in element includes a connecting element said seat housing includes an insertion opening and a lock opening;
    said plug-in element includes a releasable lock-in connection and a spring;
    said plug-in element being inserted into said insertion opening of said seat housing and said plug-in element residing primarily within said seat housing;
    said connecting element of said plug-in element interengages said recess (R) of said retaining bolt (P) securing said seat housing and said first wall (X) to said retaining bolt (P) and said second wall or ceiling (Y);
    said releasable lock-in connection of said plug-in element interengages lock opening in said seat housing when said plug-in element interengages said seat housing locking said plug-in element to said seat housing;
    said spring of said plug-in element interengages seat housing when said plug-in element is locked to said seat housing;
    and, said spring urging said plug-in element out of said seat housing when said lock-in connection is released from said opening of seat housing.

2. An arrangement in combination with a first wall or panel (X) and a ceiling or second wall (Y) as claimed in claim 1, wherein said seat housing includes a narrowing guide, said connecting element is a U-shaped wire spring, said plug-in element includes sides, said sides are guided past said retaining bolt P when said plug-in element is pushed into said seat housing, said sides are forced to approach one another by said narrowing guide located in said seat housing until said sides, engage said recess of said retaining bolt (P).

3. An arrangement in combination with a first wall or panel (X) and a ceiling or second wall (Y) as claimed in claim 1, wherein: said seat housing includes a narrowing guide, said connecting element is a U-shaped wire spring, said connecting element includes sides, said sides of said connecting element are spaced apart from said retaining bolt (P) at a distance therefrom, said plug-in element is pushed into said seat housing, said sides approach one another through said narrowing guide until said sides, engage said recess of said retaining bolt (P).

4. An arrangement in combination with a first wall or panel (X) and a ceiling or second wall (Y) as claimed in claim 2, wherein: said U-shaped wire spring pushes said plug-in element out of said seat housing when said lock-in connection between said plug-in element and said seat housing is released.

5. An arrangement in combination with a first wall or panel (X) and a ceiling or second wall (Y) as claimed in claim 1, wherein: said seat housing includes a spring tongue, said plug-in element includes a second recess, said spring tongue locks into said second recess of said plug-in element locking said lock-in connection between said seat housing and said plug-in element.

6. An arrangement in combination with a first wall or panel (X) and a ceiling or second wall (Y) as claimed in claim 5, wherein: said spring tongue includes a free end and said free end of said spring tongue is accessible for manual operation in order to release said lock-in connection.

7. An arrangement in combination with a first wall or panel (X) and a ceiling or second wall (Y) as claimed in claim 5, wherein: said spring tongue is plastic or spring steel.

8. An arrangement in combination with a first wall or panel (X) and a ceiling or second wall (Y) as claimed in claim 7, wherein: said seat housing includes a two-sided leaf spring of spring steel, said two-sided leaf spring includes a crown, one side of said leaf spring is formed by said spring tongue and the other side of said leaf spring is said opening spring, where said crown of said leaf spring is fitted positively into said seat housing.

9. An arrangement in combination with a first wall or panel (X) and a ceiling or second wall (Y) as claimed in claim 1, wherein: said opening spring is a leaf spring located in said seat housing which exerts pressure in an opening direction on said plug-in element.

10. An arrangement in combination with a first wall or panel (X) and a ceiling or second wall (Y) as claimed in claim 1 wherein: said opening spring is a spiral pressure spring located between said seat housing and said plug-in element and said spiral spring exerts pressure on said plug-in element in an opening direction.

11. An arrangement in combination with a first wall or panel (X) and a ceiling or second wall (Y) as claimed in claim 1 wherein: said retaining bolt (P) is joined to said ceiling (Y) or wall via a vibration damping ring.

12. An arrangement in combination with a first wall or panel (X) and a ceiling or second wall (Y) as claimed in claim 1, wherein:
  said recess of said retaining bolt (P) comprises two lateral opposing notches; and,
  said connecting element includes an open slit, said open slit includes edges which are inserted into said recess of said retaining bolt (P).

13. An arrangement in combination with a first wall or panel (X) and a ceiling or second wall (Y) as claimed in claim 1, wherein:
  said recess of said retaining bolt (P) is a circumferential recess; and,
  said connecting element includes an open slit, said open slit includes edges which are inserted into said recess of said retaining bolt (P).

14. An arrangement in combination with a first wall or panel (X) and a ceiling or second wall (Y) as claimed in claim 1, wherein:
  said seat housing includes a wall; and,
  said releasable lock-in connection includes spring-loaded locking tappets located on said plug-in element which interengage and lock into said lock openings in the wall of said seat housing.

15. An arrangement in combination with a first wall or panel (X) and a ceiling or second wall (Y) as claimed in claim 1, wherein: said seat housing includes an abutment; said spring is a leaf spring, and, said leaf spring includes a spring arm which exerts pressure by spring force on an abutment located in said seat housing in said locked condition when said lock-in connection is engaged with said seat housing and said spring urging said plug-in element out of said seat housing when said lock-in connection is released from said opening of seat housing.

16. An arrangement in combination with a first wall or panel (X) and a ceiling or second wall (Y) as claimed in claim 1, wherein movement of said plug-in element out of said seat housing is restricted by a stop.

17. An arrangement in combination with a first wall or panel (X) and a ceiling or second wall (Y) as claimed in claim 16 wherein: said plug-in element includes a spring tappet and said seat housing element includes a guide groove for said spring tappet, and, said groove includes an end and said end of said groove forms a stop.

* * * * *